(12) United States Patent
Teramoto

(10) Patent No.: US 9,372,569 B2
(45) Date of Patent: Jun. 21, 2016

(54) LIQUID CRYSTAL DISPLAY DEVICE WITH A BUILT-IN TOUCH PANEL

(71) Applicant: Japan Display Inc., Tokyo (JP)

(72) Inventor: Masahiro Teramoto, Mobara (JP)

(73) Assignee: Japan Display Inc., Tokyo (JP)

( * ) Notice: Subject to any disclaimer, the term of this patent is extended or adjusted under 35 U.S.C. 154(b) by 339 days.

(21) Appl. No.: 14/010,805

(22) Filed: Aug. 27, 2013

(65) Prior Publication Data

US 2014/0055412 A1    Feb. 27, 2014

(30) Foreign Application Priority Data

Aug. 27, 2012 (JP) ................... 2012-186035

(51) Int. Cl.
*G06F 3/041* (2006.01)
*G02F 1/1333* (2006.01)
*G02F 1/1337* (2006.01)

(52) U.S. Cl.
CPC .......... *G06F 3/0412* (2013.01); *G02F 1/13338* (2013.01); *G02F 1/133707* (2013.01); *G02F 2201/12* (2013.01)

(58) Field of Classification Search
CPC .......... G02F 1/13338; G02F 1/133707; G02F 2201/12; G06F 3/0412
See application file for complete search history.

(56) References Cited

U.S. PATENT DOCUMENTS

| | | | | |
|---|---|---|---|---|
| 2010/0214262 | A1* | 8/2010 | Ishizaki | G02F 1/13338 345/174 |
| 2010/0225612 | A1* | 9/2010 | Ishizaki | G02F 1/13338 345/174 |
| 2012/0044203 | A1* | 2/2012 | Ishizaki | G06F 3/0412 345/174 |
| 2012/0062511 | A1* | 3/2012 | Ishizaki | G06F 3/044 345/174 |

FOREIGN PATENT DOCUMENTS

JP    2010-231186    10/2010

* cited by examiner

*Primary Examiner* — Kenneth Bukowski
(74) *Attorney, Agent, or Firm* — Typha IP LLC

(57) ABSTRACT

A difference between a length Ls of a slit and a length Ld of a dummy electrode is within ±15% of the length Ld. A difference between a length Le in the first direction of a portion between the slits adjacent to each other in the first direction in a detection electrode and the length Ld of the dummy electrode is within ±15% of the length Ld. A difference between a width Ws of the slit and a gap Dde between the dummy electrode and the detection electrode adjacent to each other in the second direction is within ±15% of the gap Dde. A difference between a width We in the second direction of a portion obtained by dividing the detection electrode by the slit and a width Wd of the dummy electrode is within ±15% of the width Wd.

3 Claims, 5 Drawing Sheets

LIQUID CRYSTAL DISPLAY DEVICE WITH A BUILT-IN TOUCH PANEL

CROSS-REFERENCE TO RELATED APPLICATION

The present application claims priority from Japanese application JP2012-186035 filed on Aug. 27, 2012, the content of which is hereby incorporated by reference into this application.

BACKGROUND OF THE INVENTION

1. Field of the Invention

The present invention relates to a display device with a built-in touch panel.

2. Description of the Related Art

Most touch panels currently in widespread use are of an external type that is used in combination with a display panel. Since the touch panel is a component that is separated from the display panel, it is difficult to reduce the entire thickness of the device. In contrast to this, in-cell touch panels, which are of a type that is incorporated into a display panel, have a structure contributing to a reduced thickness.

JP 2010-231186 A discloses that dummy electrodes are formed in a space between detection electrodes in an in-cell touch panel. This is effective, from the viewpoint of appearance, for equalizing reflectance to suppress the view of electrode. However, since the dummy electrode blocks an electric line of force from a counter electrode, it is preferable, in terms of the detection of a touch, that the dummy electrode is subdivided with many cuts formed therein.

In terms of appearance, a gap of all electrodes including detection electrodes and dummy electrodes is preferably 50 µm or less (particularly 30 µm or less), and the width of the detection electrode and the width of the dummy electrode are ideally equal to each other. By doing this, a uniform pattern distribution can be obtained, so that visibility can be most reduced. However, since the width and gap of the detection electrodes depend on the product specification, the dummy electrode cannot be necessarily subdivided in such dimensions. Actually, when the width of the dummy electrode is within ±15% with respect to the width of the detection electrode, an effect of reducing visibility can be sufficiently obtained.

Depending on the product specification, however, the gap of the dummy electrodes is reduced because of a narrow gap of the detection electrodes. Therefore, it is conceivable that detection sensitivity cannot be sufficiently assured. In this case, the dummy electrode has to be further subdivided. However, if doing so, a difference in density of pattern is generated between a detection electrode portion and a dummy electrode portion, visibility is increased, and thus the appearance is deteriorated. As a countermeasure, it is conceivable that the detection electrode is subdivided by dividing it into a plurality of portions to thereby be brought close to the subdivided pattern of the dummy electrode. However, this increases the resistance of the detection electrode in proportion to the number of divided portions, which is a new factor of reducing detection sensitivity.

SUMMARY OF THE INVENTION

It is an object of the invention to provide a display device with a built-in touch panel that satisfies both of an enhancement in appearance and an enhancement in detection sensitivity by visually subdividing a detection electrode with a suppressed resistance.

(1) A display device with a built-in touch panel according to an aspect of the invention includes: a first substrate; a second substrate; a plurality of pixel electrodes provided between the first substrate and the second substrate; a plurality of common electrodes provided between the first substrate and the second substrate; a plurality of detection electrodes provided on the first substrate such that each of the detection electrodes extends in a first direction and that adjacent ones thereof are aligned with a gap in a second direction orthogonal to the first direction; and a plurality of dummy electrodes provided, between the detection electrodes adjacent to each other in the second direction and with a gap from each of the adjacent detection electrodes, on the first substrate so as to be aligned in at least one line in the first direction with a gap between adjacent ones of the dummy electrodes, wherein an image is displayed by controlling light using electric fields generated between the plurality of pixel electrodes and the plurality of common electrodes, the presence or absence of a touch is detected by a difference in electrostatic capacitance due to the presence or absence of a substance blocking an electric field formed between any of the detection electrodes and any of the common electrodes, each of the detection electrodes has a plurality of slits aligned in at least one line in the first direction with a gap between adjacent ones thereof, a difference between a length Ls in the first direction of each of the slits and a length Ld in the first direction of each of the dummy electrodes is within ±15% of the length Ld, a difference between a length Le in the first direction of a portion between the slits adjacent to each other in the first direction in each of the detection electrodes and the length Ld of each of the dummy electrodes is within ±15% of the length Ld, a difference between a width Ws in the second direction of each of the slits and a gap Dde between one of the dummy electrodes and one of the detection electrodes adjacent to each other in the second direction is within ±15% of the gap Dde, and a difference between a width We in the second direction of each of two or more portions obtained by dividing each of the detection electrodes by the plurality of slits in the second direction and a width Wd in the second direction of each of the dummy electrodes is within ±15% of the width Wd. According to the aspect of the invention, since the dummy electrodes have the shape and arrangement described above, the appearance is enhanced. Moreover, the detection electrode can be visually subdivided by forming the slits, and an increase in resistance can be suppressed because the detection electrode is not cut. Moreover, since the gap between the dummy electrode and the detection electrode is provided corresponding to the width of the slit for subdividing the detection electrode, detection sensitivity can be enhanced.

(2) In the display device with a built-in touch panel according to (1), the plurality of dummy electrodes may be arranged in a plurality of lines such that adjacent ones of the lines are aligned in the second direction, and a difference between the width Ws in the second direction of each of the slits and a gap Ddd between the dummy electrodes adjacent to each other in the second direction may be within ±15% of the gap Ddd.

(3) In the display device with a built-in touch panel according to (1) or (2), the plurality of dummy electrodes may include a first group of the dummy electrodes provided to be shifted in the second direction from any of the slits and a second group of the dummy electrodes provided to be shifted in the second direction from the portion between the slits adjacent to each other in the first direction.

(4) In the display device with a built-in touch panel according to any one of (1) to (3), the plurality of slits may be arranged in a plurality of lines such that two or more of the slits are aligned in the second direction.

DETAILED DESCRIPTION OF THE INVENTION

Hereinafter, an embodiment of the invention will be described with reference to the drawings.

Figure 1:
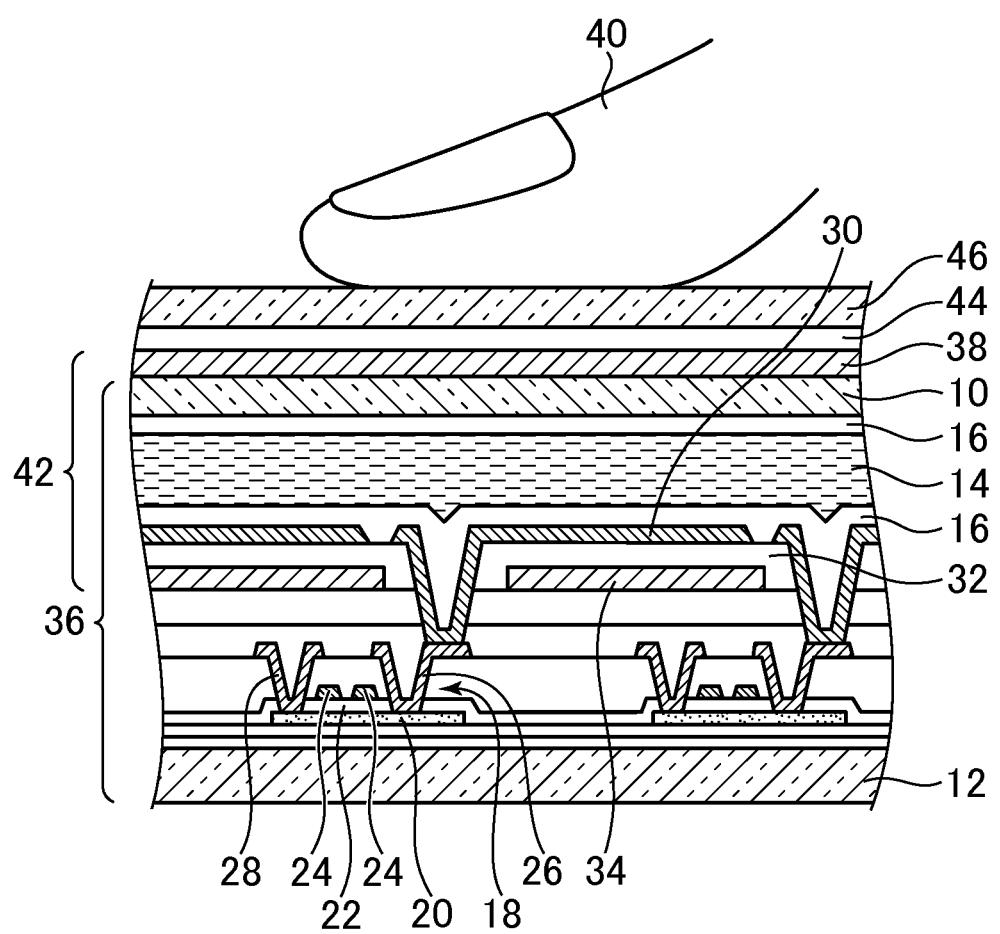
FIG. 1 is a cross-sectional view of a display device with a built-in touch panel according to an embodiment of the invention.
Figure 2:
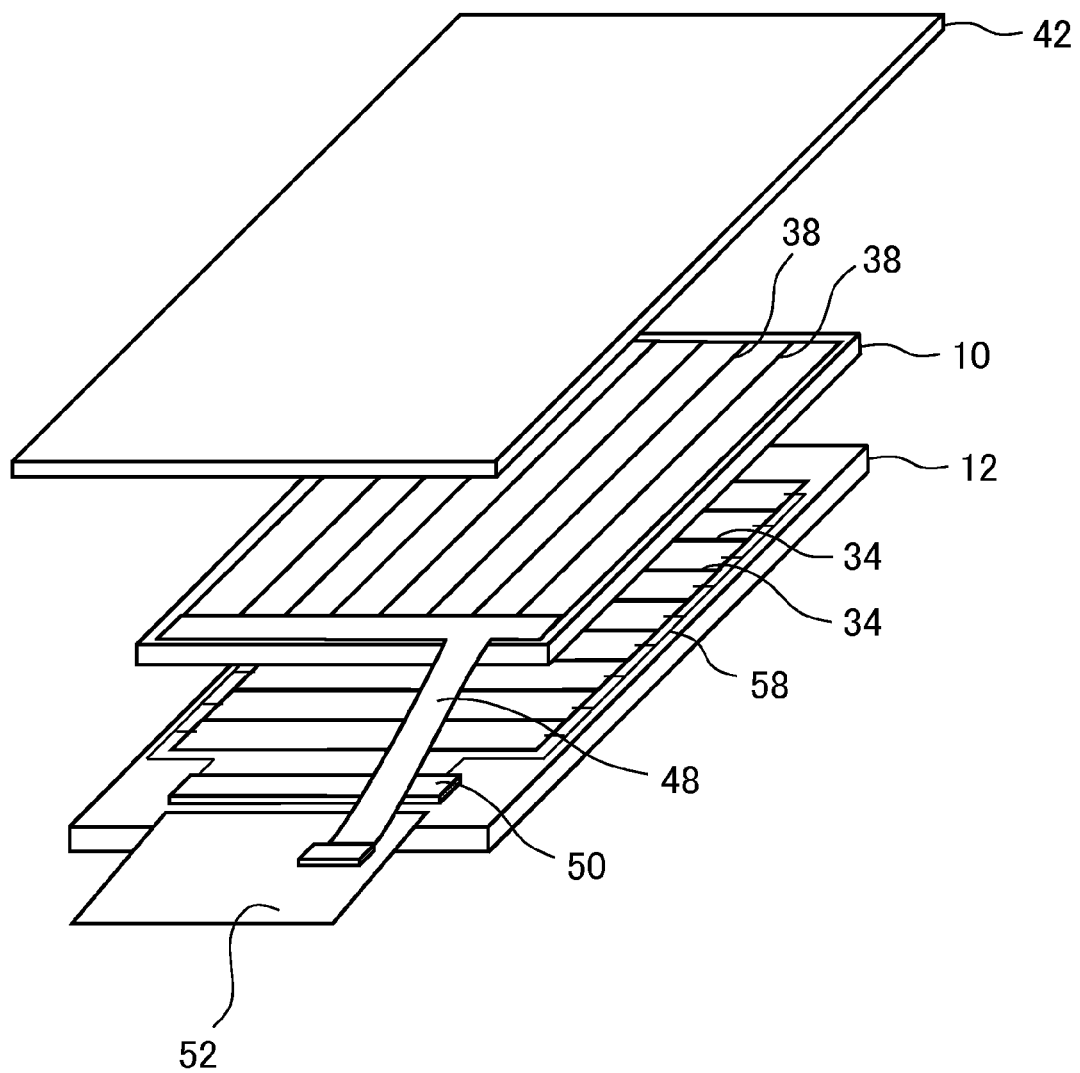
FIG. 2 is an exploded perspective view of a main portion of the display device with a built-in touch panel according to the embodiment of the invention.

FIG. 1 is a cross-sectional view of a display device with a built-in touch panel according to the embodiment of the invention. FIG. 2 is an exploded perspective view of a main portion of the display device with a built-in touch panel according to the embodiment of the invention. Although an example in which the invention is applied to a liquid crystal display device will be described below, the invention can be applied to display devices other than a liquid crystal display device (for example, an EL (Electro Luminescence) display device).

The display device with a built-in touch panel has a first substrate 10 and a second substrate 12. A liquid crystal material 14 is provided between the first substrate 10 and the second substrate 12. Alignment films 16 and 16 are formed, between the first substrate 10 and the second substrate 12, respectively at positions where the alignment films interpose the liquid crystal material 14.

The first substrate 10 is formed of a light transmissive material (for example, glass). The first substrate 10 is a color filter substrate on which a colored layer and a black matrix (both not shown) are formed. The first substrate 10 is formed with the alignment film 16. The alignment film 16 is formed on the colored layer and the black matrix (both not shown).

The second substrate 12 is formed of a light transmissive material (for example, glass). The second substrate 12 is also referred to as TFT substrate because thin film transistors 18 are formed thereon. The thin film transistor 18 includes a semiconductor film 20 such as of polysilicon, a gate insulating film 22 covering the semiconductor film 20, a gate electrode 24 provided above the semiconductor film 20 via the gate insulating film 22, and a source electrode 26 and a drain electrode 28 both penetrating through the gate insulating film 22 to be electrically connected to the semiconductor film 20.

One of the source electrode 26 and the drain electrode 28 is electrically connected to a pixel electrode 30. Moreover, a common electrode 34 is formed via an insulating film 32 at a layer position different from the pixel electrode 30. In the example of FIG. 1, the pixel electrode 30 is located above the common electrode 34 (the side distant from the second substrate 12). However, the common electrode 34 may be provided above the pixel electrode 30.

A liquid crystal display panel 36 is configured from the components described above. An image is displayed by controlling light using electric fields generated between a plurality of pixel electrodes 30 and a plurality of common electrodes 34. In the embodiment, the liquid crystal material 14 is driven by the electric field formed between the pixel electrode 30 and the common electrode 34. Since the pixel electrodes 30 and the common electrodes 34 are formed on the second substrate 12, the electric field formed between the pixel electrode 30 and the common electrode 34 is a lateral electric field. Alternatively, the liquid crystal material 14 may be driven by a vertical electric field by forming the pixel electrodes 30 on the second substrate 12 and forming the common electrodes 34 on the first substrate 10. In either configuration, the pixel electrodes 30 and the common electrodes 34 are provided between the first substrate 10 and the second substrate 12.

The display device with a built-in touch panel has detection electrodes 38 formed on the first substrate 10. In the example of FIG. 1, the detection electrode 38 is provided on a surface of the first substrate 10 on the side opposite to the liquid crystal material 14. As shown in FIG. 2, the plurality of common electrodes 34 extend in the lateral direction, and adjacent ones thereof are aligned in the vertical direction.

The presence or absence of a touch is detected by a difference in electrostatic capacitance due to the presence or absence of a substance blocking an electric field formed between the detection electrode 38 and the common electrode 34. Specifically, different voltages are applied to the detection electrode 38 and the common electrode 34 to form an electric field (fringe electric field) therebetween (specifically to the outside of a facing area). The presence or absence of a touch is detected by a difference in electrostatic capacitance due to the presence or absence of a substance (for example, a finger 40) blocking the electric field formed between the detection electrode 38 and the common electrode 34. That is, the first substrate 10, the detection electrodes 38, and the common electrodes 34 constitute a touch panel 42. A front panel 46 is attached via an adhesive layer 44 to the touch panel 42 for reinforcement.

According to the embodiment, since the touch panel 42 is built into the display device, the device can be made thinner than in the past. Moreover, since the liquid crystal display panel 36 and the touch panel 42 share the first substrate 10, a countermeasure against misalignment between the liquid crystal display panel 36 and the touch panel 42 is not necessary.

The first substrate 10 has a rectangular planar shape. In the vertical direction along the long side of the rectangular planar shape, the plurality of detection electrodes 38 extend. A flexible wiring board 48 is attached to the first substrate 10 for an electrical connection between the detection electrodes 38 and the outside. An integrated circuit chip 50 having a liquid crystal driving circuit built therein is mounted on the second substrate 12, and a flexible wiring board 52 is attached to the second substrate 12 for an electrical connection with the outside.

Figure 3:
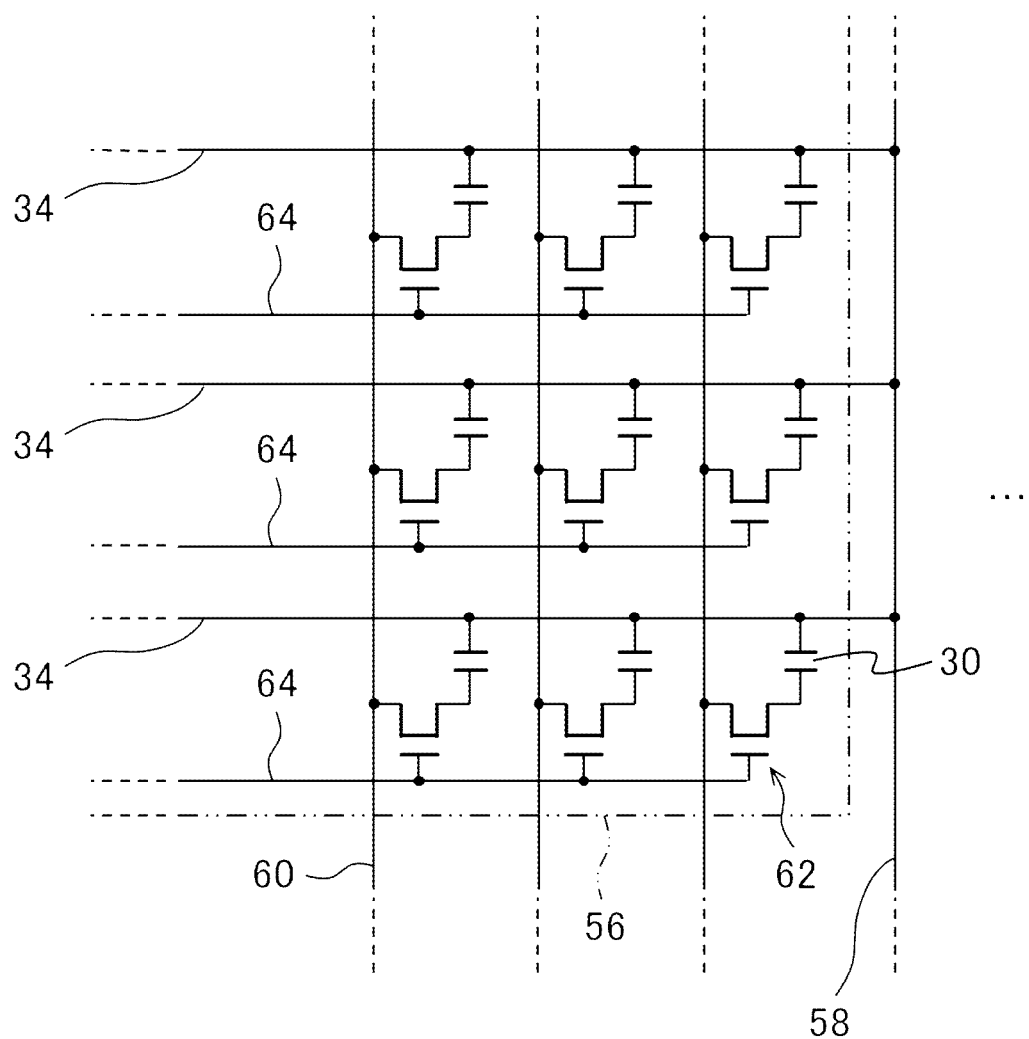
FIG. 3 shows a circuit for displaying an image on a liquid crystal display panel.

FIG. 3 shows a circuit for displaying an image on the liquid crystal display panel 36. The pixel electrodes 30 are formed in an image display area 56. Since pixels are formed by the plurality of pixel electrodes 30, an area surrounding the plurality of pixel electrodes 30 is the image display area 56. The common electrodes 34 are formed in the image display area 56. The common electrode 34 is set at a reference potential (for example, GND), and a voltage according to the brightness of a pixel is applied to the pixel electrode 30. An image is displayed by controlling light (for example, driving of the liquid crystal material 14) using the electric fields generated between the pixel electrodes 30 and the common electrodes 34.

The common electrode 34 is electrically connected to a common wiring 58, while the pixel electrode 30 is electrically connected to a signal line 60. A switching element 62 (for example, the thin film transistor 18 shown in FIG. 1) is connected between the pixel electrode 30 and the signal line 60, so that electrical continuity and cut-off between the pixel electrode 30 and the signal line 60 can be made. The switching element 62 is connected to a scanning line 64 extracted from a scanning circuit (not shown), and driven (turned on/off) by a scanning signal input to the scanning line 64.

Figure 4:
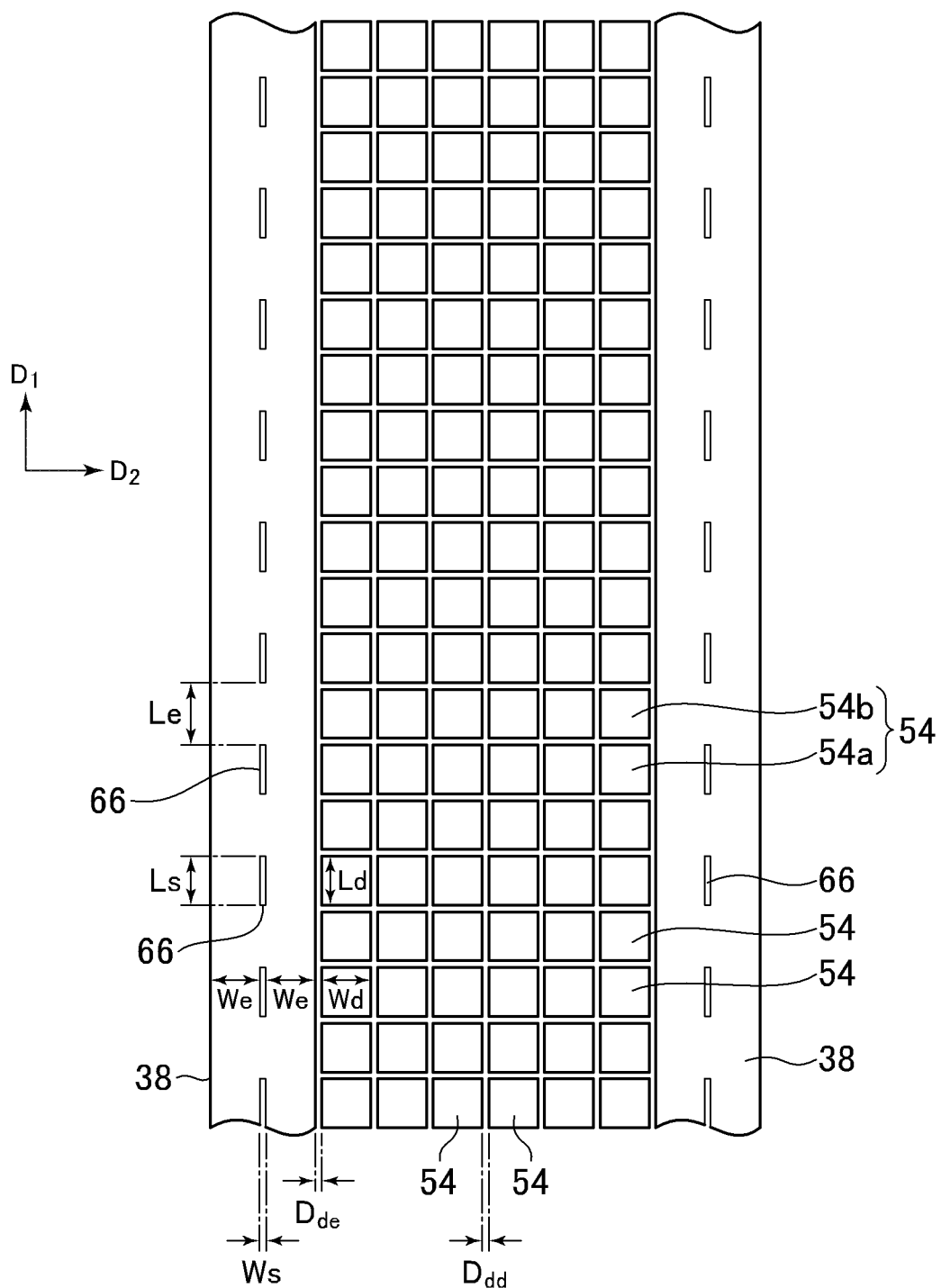
FIG. 4 is a plan view showing details of detection electrodes and dummy electrodes.

FIG. 4 is a plan view showing details of the detection electrodes 38 and dummy electrodes 54. The plurality of detection electrodes 38 extend in a first direction $D_1$ (vertical direction), and adjacent ones thereof are aligned in a second direction $D_2$ (lateral direction) orthogonal to the first direction $D_1$. The plurality of common electrodes 34 (refer to FIG. 2), which are not shown in FIG. 4, extend in the lateral direction (the second direction $D_2$), and adjacent ones thereof are aligned in the vertical direction (the first direction $D_1$). The plurality of detection electrodes 38 are arranged with a gap between adjacent ones thereof. With the gap, a fringe electric field can be increased. The detection electrode 38 is formed of a conductive material having high visible light transmittance such as, for example, ITO (Indium Tin Oxide). However, when the film thickness is increased, the detection electrode 38 is likely to be visible from the outside.

The plurality of dummy electrodes 54 are provided between the detection electrodes 38 adjacent to each other in the second direction $D_2$. The plurality of dummy electrodes 54 are provided on the first substrate 10 (refer to FIG. 2). The plurality of dummy electrodes 54 are provided with a gap from each of the adjacent detection electrodes 38. The plurality of dummy electrodes 54 are aligned in at least one line in the first direction $D_1$ with a gap between adjacent ones thereof. That is, between the adjacent detection electrodes 38, the plurality of dummy electrodes 54 are aligned with a gap therebetween in the gap direction (the second direction $D_2$) of the detection electrodes 38. Moreover, the plurality of dummy electrodes 54 are aligned with a gap therebetween in the direction (the first direction $D_1$) in which the detection electrode 38 extends. The plurality of dummy electrodes 54 are arranged in a plurality of lines such that adjacent ones of the lines are aligned in the second direction $D_2$. The dummy electrode 54 is formed of the same material as that of the detection electrode 38.

The dummy electrode 54 is in an electrically floating state. That is, the dummy electrode 54 is not connected to a reference potential such as GND, or not connected to the detection electrode 38 or other wirings. However, the dummy electrode 54 may be connected as necessary to a reference potential such as GND. The plurality of dummy electrodes 54 are arranged with a gap between adjacent ones thereof.

For detecting the presence or absence of a touch, a fringe electric field is used. The fringe electric field is distributed between an edge of the detection electrode 38 and the common electrode 34. For example, when there is a touch by the finger, the finger 40 serves as GND and blocks the fringe electric field. This reduces a capacitance formed between the detection electrode 38 and the common electrode 34. Therefore, by detecting the reduction (difference in capacitance), the presence or absence of the touch can be detected.

The detection electrode 38 has a plurality of slits 66 aligned in at least one line (one line in the example of FIG. 4) in the first direction $D_1$ with a gap between adjacent ones thereof.

The slits 66 each extend in the first direction $D_1$ and are aligned in the first direction $D_1$. The plurality of dummy electrodes 54 include a first group of dummy electrodes 54a provided to be shifted in the second direction $D_2$ from any of the slits 66. Moreover, the plurality of dummy electrodes 54 include a second group of dummy electrodes 54b provided to be shifted in the second direction $D_2$ from a portion between the slits 66 adjacent to each other in the first direction $D_1$.

A difference between a length Ls in the first direction $D_1$ of the slit 66 and a length Ld in the first direction $D_1$ of the dummy electrode 54 is within ±15% of the length Ld. A difference between a length Le in the first direction $D_1$ of the portion between the slits 66 adjacent to each other in the first direction $D_1$ in the detection electrode 38 and the length Ld of the dummy electrode 54 is within ±15% of the length Ld. A difference between a width Ws in the second direction $D_2$ of the slit 66 and a gap Dde between one dummy electrode 54 and one detection electrode 38 adjacent to each other in the second direction $D_2$ is within ±15% of the gap Dde. A difference between the width Ws in the second direction $D_2$ of the slit 66 and a gap Ddd between the dummy electrodes 54 adjacent to each other in the second direction $D_2$ is within ±15% of the gap Ddd. A difference between a width We in the second direction $D_2$ of each of two or more portions configured by dividing the detection electrode 38 by the slit 66 in the second direction $D_2$ and a width Wd in the second direction $D_2$ of the dummy electrode 54 is within ±15% of the width Wd.

According to the embodiment, since the dummy electrodes 54 have the shape and arrangement described above, the appearance is enhanced. Moreover, the detection electrode 38 can be visually subdivided by forming the slits 66, and an increase in resistance can be suppressed because the detection electrode is not cut. Moreover, since the gap between the dummy electrode 54 and the detection electrode 38 is provided corresponding to the width of the slit 66 for subdividing the detection electrode 38, detection sensitivity can be enhanced.

Figure 5:
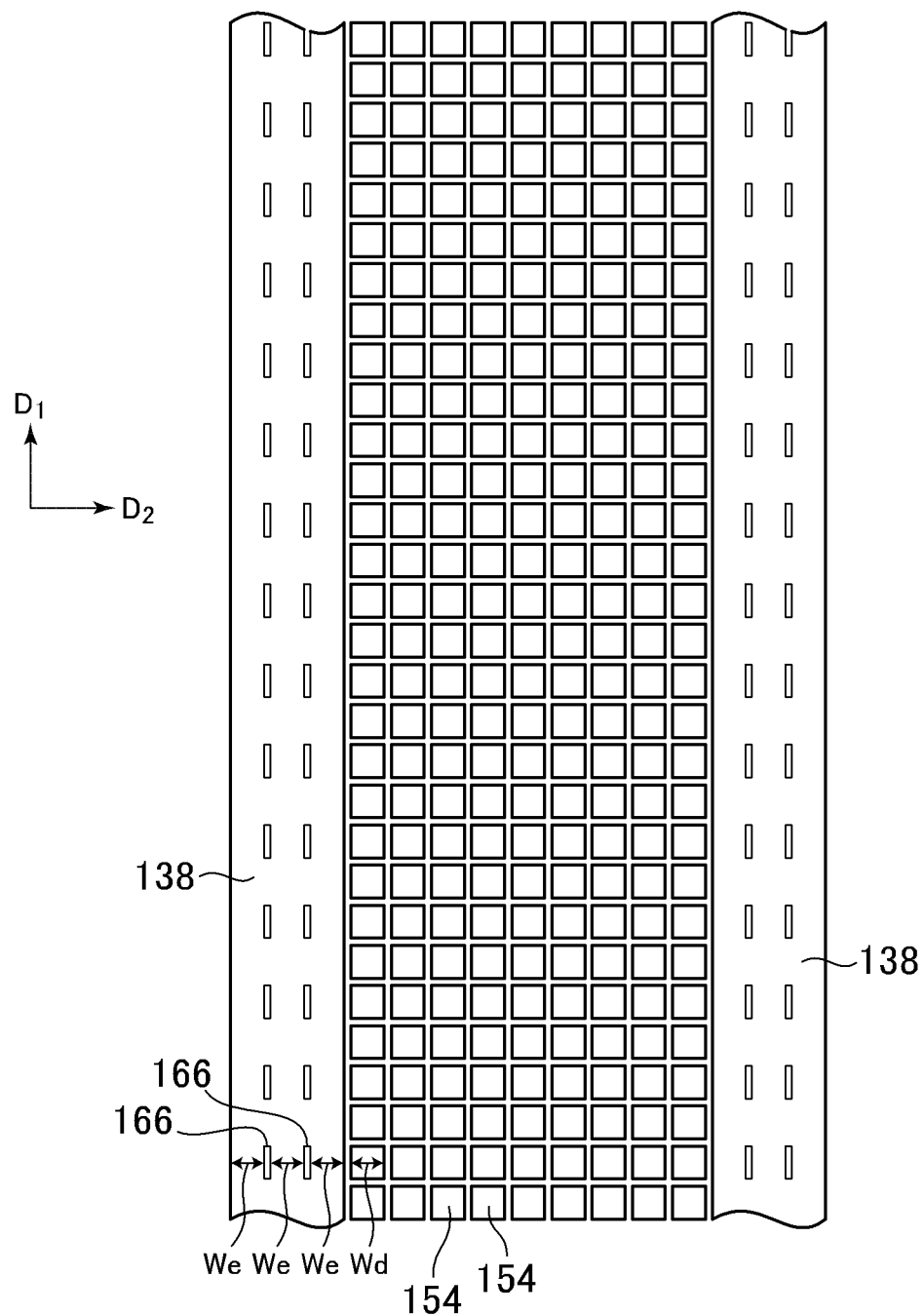
FIG. 5 is a plan view showing details of detection electrodes and dummy electrodes according to a modified example.

FIG. 5 is a plan view showing details of detection electrodes and dummy electrodes according to a modified example. In this example, a plurality of slits 166 are arranged in a plurality of lines such that two or more slits 166 are aligned in the second direction $D_2$. With n (2≤n) slits 166 aligned in the second direction $D_2$, each of detection electrodes 138 is divided into n+1 portions. The divided portions have the same width in the second direction $D_2$.

In the modified example, a difference between the width We in the second direction $D_2$ of each of three or more portions configured by dividing the detection electrode 138 by the plurality of slits 166 in the second direction $D_2$ and the width Wd in the second direction $D_2$ of a dummy electrode 154 is within ±15% of the width Wd. The contents described in the embodiment apply to other configurations.

While there have been described what are at present considered to be certain embodiments of the invention, it will be understood that various modifications may be made thereto, and it is intended that the appended claims cover all such modifications as fall within the true spirit and scope of the invention.

What is claimed is:
1. A display device with a built-in touch panel comprising:
a first substrate;
a second substrate;
a plurality of pixel electrodes provided between the first substrate and the second substrate;
a plurality of common electrodes provided between the first substrate and the second substrate;

a plurality of detection electrodes provided on the first substrate such that each of the detection electrodes extends in a first direction and that adjacent ones thereof are aligned with a gap in a second direction orthogonal to the first direction; and a plurality of dummy electrodes provided, between the detection electrodes adjacent to each other in the second direction and with a gap from each of the adjacent detection electrodes, on the first substrate so as to be aligned in at least one line in the first direction with a gap between adjacent ones of the dummy electrodes, each of the dummy electrodes having an almost square shape in a plan view, wherein an image is displayed by controlling light using electric fields generated between the plurality of pixel electrodes and the plurality of common electrodes, the presence or absence of a touch is detected by a difference in electrostatic capacitance due to the presence or absence of a substance blocking an electric field formed between any of the detection electrodes and any of the common electrodes, each of the detection electrodes has a plurality of slits arranged in a plurality of lines such that two or more of the slits are aligned in the second direction with a gap between adjacent ones thereof, a difference between a length Ls in the first direction of each of the slits and a length Ld in the first direction of each of the dummy electrodes is within ±15% of the length Ld, a difference between a length Le in the first direction of a portion between the slits adjacent to each other in the first direction in each of the detection electrodes and the length Ld of each of the dummy electrodes is within ±15% of the length Ld, a difference between a width Ws in the second direction of each of the slits and a gap Dde between one of the dummy electrodes and one of the detection electrodes adjacent to each other in the second direction is within ±15% of the gap Dde, and a difference between a width We in the second direction of each of two or more portions obtained by dividing each of the detection electrodes by the plurality of slits in the second direction and a width Wd in the second direction of each of the dummy electrodes is within ±15% of the width Wd.

2. The display device with a built-in touch panel according to claim 1, wherein the plurality of dummy electrodes are arranged in a plurality of lines such that adjacent ones of the lines are aligned in the second direction, and a difference between the width Ws in the second direction of each of the slits and a gap Ddd between the dummy electrodes adjacent to each other in the second direction is within ±15% of the gap Ddd.

3. The display device with a built-in touch panel according to claim 1, wherein the plurality of dummy electrodes include a first group of the dummy electrodes provided to be shifted in the second direction from any of the slits and a second group of the dummy electrodes provided to be shifted in the second direction from the portion between the slits adjacent to each other in the first direction.

\* \* \* \* \*